United States Patent [19]

Becker et al.

[11] 4,209,159
[45] Jun. 24, 1980

[54] LOCKABLE GUIDE ASSEMBLY FOR ADJUSTABLE VEHICLE SEATS

[75] Inventors: Burckhard Becker; Heinz Bauer; Alfred Gedig, all of Solingen, Fed. Rep. of Germany

[73] Assignee: C. Rob. Hammerstein GmbH, Soligen-Merscheid, Fed. Rep. of Germany

[21] Appl. No.: 868,252

[22] Filed: Jan. 10, 1978

[30] Foreign Application Priority Data

Jan. 22, 1977 [DE] Fed. Rep. of Germany ....... 2702576
Apr. 7, 1977 [DE] Fed. Rep. of Germany ....... 2715640

[51] Int. Cl.[2] ........................................ F16M 13/00
[52] U.S. Cl. .................................... 248/430; 297/344
[58] Field of Search .............. 248/429, 430, 420; 308/3.8; 297/318, 317, 344, 387

[56] References Cited

U.S. PATENT DOCUMENTS

| | | | |
|---|---|---|---|
| 1,838,199 | 12/1931 | Thomas | 248/429 |
| 2,574,162 | 11/1951 | Baker | 308/3.8 |
| 2,877,824 | 3/1959 | Hüttisch | 248/429 |
| 3,147,947 | 9/1964 | Dall | 248/420 |
| 3,524,677 | 8/1970 | Louton | 248/430 X |
| 3,917,342 | 11/1975 | Furuta | 248/429 X |
| 3,926,397 | 12/1975 | Hunwicks | 248/430 |
| 4,018,488 | 4/1977 | Manson | 248/429 |

FOREIGN PATENT DOCUMENTS

737270 6/1966 Canada ....................................... 248/430
455159 2/1950 Italy ............................................ 248/429

Primary Examiner—Roy D. Frazier
Assistant Examiner—Robert W. Gibson, Jr.
Attorney, Agent, or Firm—Ladas & Parry

[57] ABSTRACT

A lockable guide assembly for adjustable vehicle seats comprising a pair of parallel guided rails attached to the vehicle seat; a pair of parallel guiding rails slidably arranged with respect to the guided rails and attached to the vehicle floor. Each of the rails is formed with a high-webbed U-shaped cross-section with inner and outer arms substantially overlapping with the arms of the U-shaped section of the other rail, the height of each section being about twice its width. The inner arm on each rail extends into the U-shaped portion of the other rail occupying nearly the full depth of the U-shaped portion leaving only a small gap between the free end of the inner arm and the inside surface of the U-shaped portion of the outer arm. The outer arms are wider or deeper than the inner arms and extending beyond the depths of the inner arms, and the outer circumference of the U-shaped portion of the guided rails is straddled by the arms of the guiding rail.

4 Claims, 10 Drawing Figures

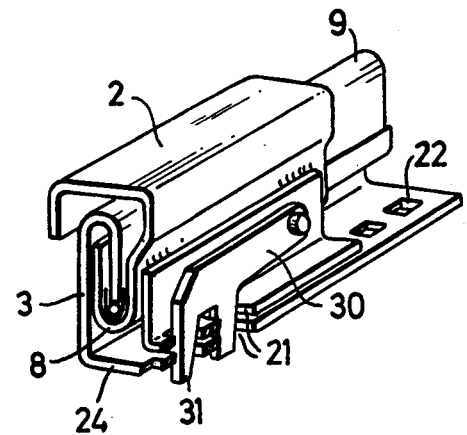
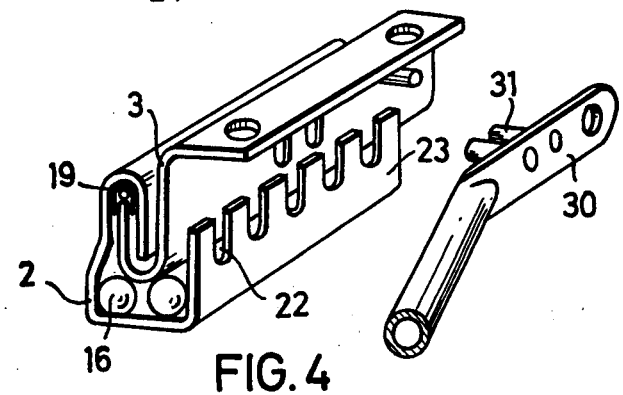
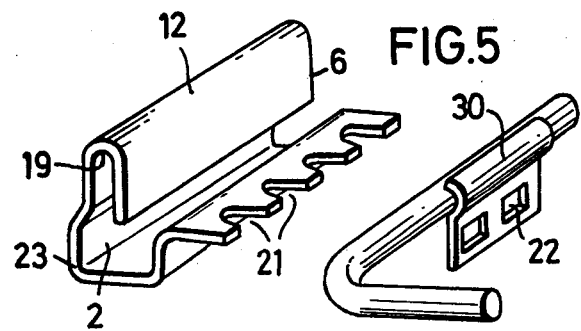

LOCKABLE GUIDE ASSEMBLY FOR ADJUSTABLE VEHICLE SEATS

The invention relates to a lockable guide assembly for adjustable vehicle seats and consists of two pairs of slidable rails, each of which is composed of a guided rail, which is attached for instance to the vehicle seat, and a guiding rail, which co-operates with the guided rail and is attached for instance to the vehicle floor.

In order to permit adjustment of a safety belt independently of the position of the vehicle seat, there is now a trend in the design of passenger cars to attach the safety belt to the vehicle seat and not to the body of the vehicle. For this reason the purpose of the guide assembly is now not only to make the seat movable and lockable, but the guides have to receive and transmit the inertia forces due to acceleration or deceleration generated during an accident, particularly head-on collisions and rear-end collisions. Particularly in the case of accidents involving damage to the front or rear of the vehicle, the guides supporting the vehicle seat are highly stressed in a vertical direction by the safety belts. Due to this it can happen during an accident that the rails which interengage are torn apart very much as a slide fastner. The person strapped to the seat loses in such a case any connection with the vehicle and can therefore be severely injured.

It is the object of the invention to devise an adjustable guide assembly which can withstand the high bending moments generated during an accident and which will not be torn apart even in a serious accident.

According to the invention, each of the two rails is high-webbed and both rails are generally U-shaped in cross-section. The height of the rails is about twice their width and each rail with its inner arm extends into the U-shaped portion of the other rail occupying nearly the whole depth of the elongate U-shaped space. Only a small gap remains on the side between the inner arm and the inner surfaces of the u-shaped portion, the outer arms being extended beyond the length of the inner arms, the outer circumference of the U-shaped portion of the guided rail being straddled by the outer arm of the guided rail.

The guide assembly in profile is high-webbed and the two rails clasp each other to a relatively large vertical extent. As a result of this shape, high bending moments may be received in a vertical direction and tearing away of the two rails in the manner of a slide fastener is to a great extent prevented. The free arms of each of the rails, which extend deeply into the inner of the U-shaped of the other arm prevent the clasping rails from being bent. Preferably the shaped portions are so dimensioned that on overloading the material begins to yield before the clasping flanges can be bent.

It is a further object of the invention to dimension the rails in such a way that loads acting at an angle of about 30 degrees forwards and upwards of up to 3000 Kilogram-force (Kgf) may be received without the rail halves being torn apart from each other. Within this range the long free arms prevent the horizontally extending tracks of the rails being bent upwards. The free arm ends provide support against invert curving of the corresponding U-shape of the other rail so that at the end of the peak stress the rail profile remains substantially unchanged.

It is yet a further object of the invention to provide a symmetrical guide assembly. Each rail straddles the other rail similarly in the manner of two U-shaped profiles being hooked into each other. This prevents one of the rails from being bent and the other from being torn apart therefrom. As the greatest part of the used material extends in vertical direction also the loadability in vertical direction is high.

It is a still further object that at least one elongate channel for accommodating slide elements be provided between the outer circumference of the guided rail and the inner surface of the outer arm of the guided rail, which arm is bent around this outer circumference. The weight of the seat and possibly also the weight of a person sitting on the seat is transmitted through these slide elements from the one on to the other rail without affecting their movability.

According to a further feature of the invention, the slide elements are in the form of balls located between the corners of the guiding rail and two tracks formed on the outer circumference of the guided rail. These tracks are die-formed at the same time by pressing of the rails. As the rails are formed by cold pressing, a desirable cold strengthening takes place in the area of the tracks. It is useful to arrange the balls in a cage.

According to yet a further feature of the invention, the inner arm of the guiding or guided rail at its narrow surface is connected to a strip of elastic material. This strip and the narrow surface are surrounded by a slide show which bears slidably with its outer surface on the inner circumference of the U-shaped profile of the guiding or guided rail. The strip of elastic material ensures that the two rails are free from play when not subjected to load so that rattling is prevented. The strip of elastic material is surrounded from all sides and during the displacement of the two rails relative to each other, the material connected to the guided rail does not slide on the guiding rail and cannot therefore be worn by friction. The elastic material serves only as a cushioning means and ensures that the balls are pressed into the corners of the guiding rail. During displacement of one rail relative to the other, the slide shoe slides with its outer surface on the inner circumference of the U-shaped portion of the guiding rail. This slide shoe also surrounds the front edges of the guided rail.

According to yet another feature of the invention, at least one of the outer arms forms part of the means for the vertical adjustment of the seat. The section from which the seat rail is formed is not rolled, but is stamped out in the desired shape. This method of manufacture ensures that one of the outer arms of a rail may be part of the means for adjusting the height or inclination of the seat.

According to yet another feature one or more pawls extend through a recess in the outer arm of the U-shaped portion into a locking recess in the inner arm of the U-shaped portion of the other rail. As the profiles of both rails are high-webbed simple mounting of a locking device can easily be accomplished. As the tracks which should be locked one relative to the other are positions next to each other the pawls are exposed substantially only to shear forces.

In addition it is suggested that at least one of the rails is formed with a J-shaped profile. This shape can be obtained by bending upwards a portion of the arm of the U-shaped cross-section above the narrow surface of the other arm and also bending it away from this narrow surface. In this manner, slide elements can be omitted and the outer surface of the other rail may be provided with raised portions, wrinkles and the like to avoid sliding friction.

Finally, the two rails attached to the vehicle seat, may be connected together to form an integrated seat frame. By the connection of the two seat rails and formation of a seat frame, advantageous attachment of the rails to the vehicle seat is achieved using thin sheet metal.

In the drawings:

FIG. 3 is a perspective view of a guide assembly provided with locking means;

FIG. 4 is a view similar to FIG. 3 showing a guide with different locking means;

FIG. 5 is a perspective view of the guide rails with another force of locking means;

Figure 1:
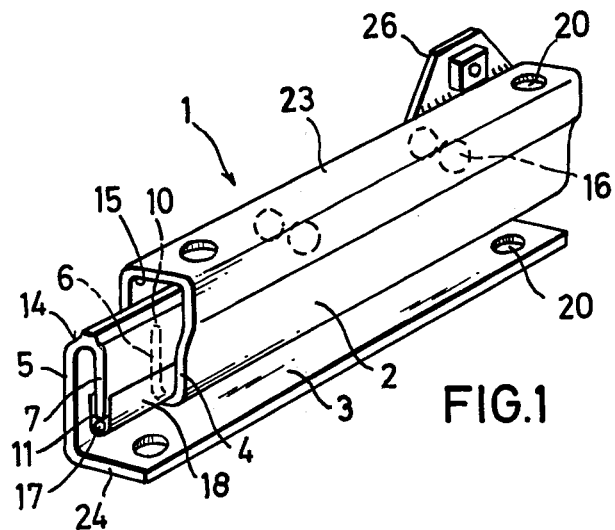
FIG. 1 is a perspective view of a preferred guide assembly according to the invention.

In the embodiment of the guide assembly 1 shown in FIG. 1, the guiding rail 3 is fixed while the guided rail 2 may be connected with the seat by means of attachment means 20 which are here formed as holes. Upon the rear end of the guided rail 2 is provided a safety belt attachment 26.

Figure 2:
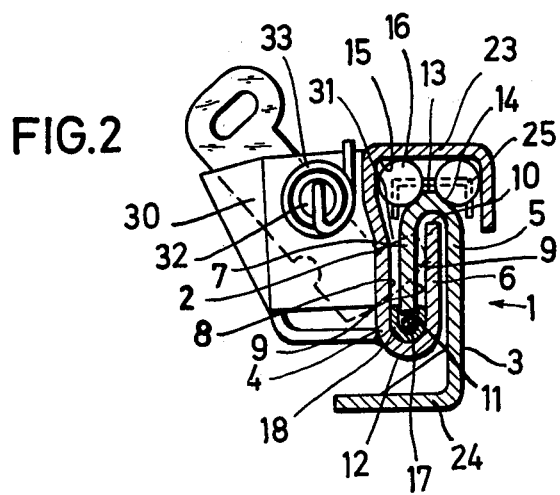
FIG. 2 is a vertical section through the guide assembly.

As is apparent from FIGS. 1 and 2 the vertical dimension of the nearly overlapping portions 4,5 of U-shaped cross-section of the two rails are larger than half of the total height of the guide rail 1. A great part of the used pressed flat material extends consequently in vertical direction which ensures good stability for the guide means against vertical stresses. The total cross-section of the guide assembly 1 according to FIGS. 1 and 2 is elongate, the width being about a half of the height.

Both the guided rail 2 and the guiding rail 3, have portions 4,5 of U-shaped cross-section. These U-shaped portions 4,5 are so arranged that one arm 6,7 extends into the U-shaped portion 4,5 from the open side of this cross-section while occupying nearly the whole depth of the U-shaped portion 4,5. Only a small gap remains between the free end of the inner arm 6,7 and the surfaces 8,9 of the U-shaped portion 4,5, this gap having on both sides of the inner arm 6,7 the same dimension, as is shown in FIGS. 1 and 2. The dimension of the two substantially overlapping U-shaped portions 4,5 is in the embodiments shown in FIGS. 1 and 2 so chosen that these U-shaped portions 4,5 are nearly twice as high as they are wide, and are generally of slim, elongate shape.

By the mutual engagement of the two U-shaped portions 4,5 it is achieved that the misled rail 2 engages with the guiding rail 3 in the same way as the guiding rail 3 into the guided rail 2. The extent of engagement is consequently symmetrical and no rail can open or bend upwardly. If the two rails 2,3 are—for instance during an accident—pulled away from each other in a vertical direction then the narrow surfaces 10,11 of the inner arms 6,7 first come into contact with the inner circumference 19 of the two U-shaped portions 4,5. Tearing of the rails of the guide away from each other is possible only when the two U-shaped portions 4,5 are bent. However as soon as the inner arms 6,7 are bent upwardly they bear against the inner surfaces 8,9 of the U-shaped portions 4,5. Small deformation of the rails 2,3 within this zone is temporary and at the end of such stressing in a vertical direction, the rails 2,3 resume their original shape.

The outer arms 23,24 of the two rails 2,3 extend beyond the length of the inner arms 6,7 and serve for the attachment of the guide means. The outer arm 23 of the guided rail 2 extends first, with small parallel displacement, in the original direction and is then twice bent at right angles to the guide 1 in such a way that it is closely conformed to the outer circumference 13 of the guiding rail 3 while being spaced apart. Due to this elongate channels are formed in which are arranged balls 16. The balls 16 are supported in the corners 15 of the guided rail 2 and also in the tracks 14 in the outer circumference 13 of the guiding rail 3. The tracks 14 are formed by pressing. As the rails 2,3 are cold pressed, also the tracks 14 are cold-work hardened. Preferably the balls run in a cage 25.

Through the balls 16 or rollers serving as slide elements and positioned between the two rails 2,3 pressure forces acting on the guide 1 may be transmitted from one of the rails on to the other without movability being impaired. When the guide assembly 1 is not subjected to stress it is not, however, without play. For this reason, the narrow surface 11 of the limb 7 of the guiding rail 3 is connected with a strip 17 of elastic material, preferably made of rubber. This strip 17 and the edges of the narrow surface 11 are in turn surrounded by a slide shoe 18 which has a U-shaped cross-section. This slide shoe 18 straddles also the front edges of the narrow surface 11. The strip 17 and slide shoe 18 are firmly connected to the guiding rail 3. Inner surface 8 of the U-shaped portion 4 of the guided rail 2 glides on the outer surface of the shoe. The balls 16 are pressed by the resilient force of the strip 17 of elastic material into the corners 15 of the guided rail 2 so that the guide 1 is without play. The strip 17 serves as a cushion and when the rails 2,3 are moved one relative to the other the strip is not exposed to friction and consequently is not worn. It is actually protected by the slide shoe 18 which is made of a hard material.

The guiding rail 3 is—as shown in FIG. 2—slidably connected at three points with the guided rail 2. The guiding of the rails 2,3 is thus statically determined. It is also possible to provide a slide shoe 18 and a strip 17 on the narrow surface 10 of the inner arm 16 forming a static isosceles triangle.

FIG. 2 shows also a locking device. A pawl 30 is connected with the guided rail 2 and is swingable about a shaft 32 extending parallel to this rail. The guided rail 2 is provided with at least one recess for at least one locking tooth 31. When the guide 1 is locked this locking tooth 31 extends through locking recesses 22 in the inner arm 7 of the guiding rail 3. Due to the fact that the profile of the rails 2,3 is high-webbed, the mounting of the locking device is simple. The pawl 30 is held in its locking position by a spring 33.

FIGS. 3 to 5 show further embodiments of the locking means for the guide assembly 1. In FIG. 3 the guided rail 2 in cross-section is J-shaped and with its horizontal limb rests on the outer surface of the curved portion of the guiding rail 3. In FIG. 4 the guiding rail 3 in cross-section is J-shaped and with the outer surface of its curved portion bear with balls 16 against the inside of the horizontal portion of the guided rail 2. The embodiment according to FIG. 4 has the disadvantage that dirt can more easily get into the tracks of the balls 16 than in the embodiment according to FIG. 3. The pawl 30 according to FIG. 3 by means of a shaft is pivotally connected to the guided rail 2 and extends through two locking notches 21 in an L-section firmly connected with the guiding rail 2 into locking notches 21 or locking recesses 22 on the outer arm 24 of the guiding rail 3. In the design according to FIG. 3 the U-shaped portions 4,5 are not weakened by the locking device.

In the embodiment according to FIG. 4 locking recesses 32 are provided in the extended outer arm 23 of guided rail which is turned upwardly at a right angle. Through these locking recesses 22 extend both the locking teeth 31 of the pawl 30 in two locking recesses 22 in the U-shaped portion of the guided rail 2. A further embodiment of a locking device is shown in FIG. 5. In this embodiment the pawl 30 has two or more locking recesses 31 which may be brought into engagement with the locking notches 21 on the extended outer arm 23 of the guiding rail 3.

All these locking devices have the advantage that the parts to be locked are situated directly one next to each other. The locking teeth 31 are therefore subjected only to shearing.

Each rail section is individually pressed. The rail sections are therefore not formed by rolling and subsequently cut to length, but for each one an accurately stamped sheet metal blank of a predetermined thickness is die-pressed to the desired shape. Only when using this method of manufacture is it possible to remain within the necessary tolerances. This manner of manufacture enables also the outer arms 24 of one of the rails 2,3 to be so extended that they may be used as a carrying or connecting part of the means for adjusting the height and inclination of the seat. Various embodiments for this purpose are illustrated in FIGS. 6 to 8.

Figure 6:
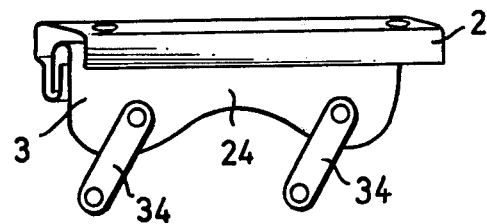
FIG. 6 is a perspective view of a guide having means for parallelogram height adjustment.

In the embodiment according to FIG. 6, the arm 24 of the guiding rail 3 is extended and connected with the vehicle via two rocker arms 34. Parallelogram height adjustment is obtained in this way.

Figure 7:
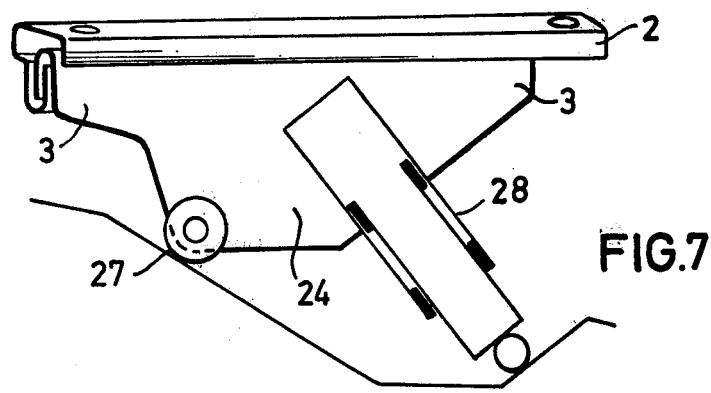
FIG. 7 is a view corresponding to FIG. 6 with means for combining longitudinal and vertical adjustment.

A combined length and height adjustment is diagrammatically illustrated in the embodiment of FIG. 7. Also in this embodiment the outer arm 24 of the guiding rail 3 is extended. It is connected with the vehicle by a roller 27 and also by a tubular guide 28.

Figure 8:
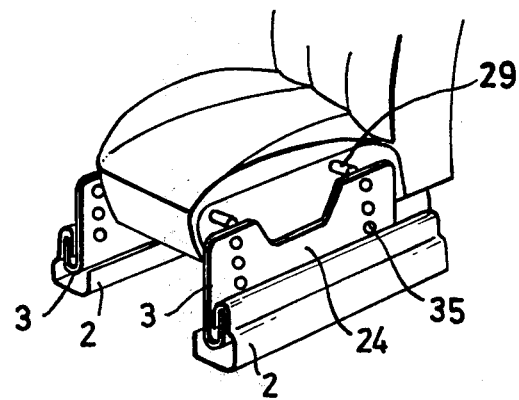
FIG. 8 is a view of a vehicle seat in which vertical adjustment is obtained by means of locking pins.

A further embodiment is illustrated in FIG. 8. The extended outer arms 24 of the guided rail 2 are provided with holes 35 in which locking pins 29 of the seat may be inserted.

Figure 9:
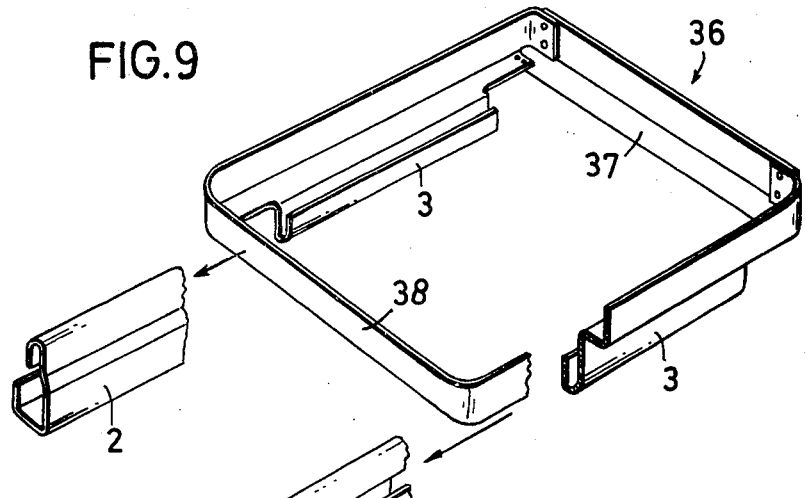
FIG. 9 is a perspective view of a seat frame formed by connection of the guide rails.

A first embodiment of a seat frame 36 with an integrated guide rail 2 is illustrated in FIG. 9. In this embodiment the portions of the outer arms 24, which extend beyond the length of the inner arms 7, are extended in the direction of the rails and are bent at right angles and are connected together. This connection is obtained by a transverse member 38. By means of an additional cross member 37, the seat frame is completed. By the rigid connection of the rails 2, forces which act on one of the rails 2 are transmitted to the other rail 3 so that the thickness of the used sheet metal may be safely reduced.

Figure 10:
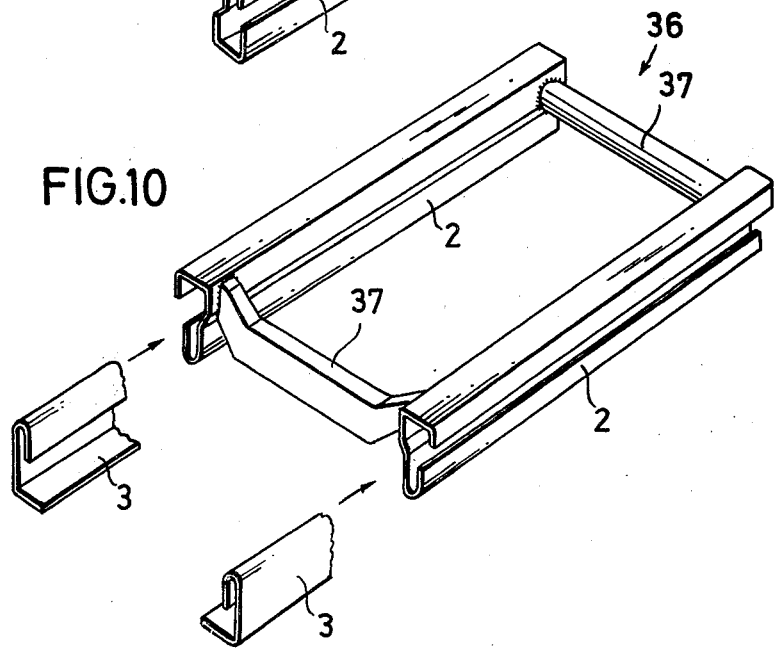
FIG. 10 is a perspective view of a second embodiment of a seat frame.

A second embodiment of a seat frame 36 is illustrated in FIG. 10. The two rails 2 attached to the seat are connected to each other by two cross members 37.

What is claimed is:

1. A seat supporting track assembly for adjustably mounting vehicle seats on vehicle floors comprising in combination:
    (1) a first pair of parallel generally L-shaped guiding rails having a flat portion attached to the vehicle floor and a double-bent narrow U-shaped upstanding portion with a curved ridge;
    (2) a second pair of parallel guided rails each having a broad double-bent generally U-shaped portion attached to the vehicle seat with a relatively broad flat, horizontal portion straddling the narrow curved ridge of each of the said guiding rails with depending portions at right angles to said horizontal portions;
    (3) parallel tracks formed in pairs on said curved ridge of each guiding rail; and
    (4) antifriction elements accommodated in the space between said tracks and said broad double-bent U-shaped portion of said guided rails.

2. A track assembly as specified in claim 1, wherein one of the depending portions of the guided rail is bent back on itself to form a second narrow U-shaped portion which interfits the narrow U-shaped portion on said guiding rail.

3. A track assembly as specified in claim 2, wherein the second narrow U-shaped portion of the guided rail has a curved inner surface holding a flexible strip and slide shoe engaged by a free edge of the narrow U-shaped upstanding portion of each of said guiding rails so as to reduce play between said guiding and guided rails.

4. A track assembly as specified in claim 2, wherein the depending portions of the guided rail forming said second narrow U-shaped portion is laterally displaced so that its free end portion is centrally located with respect to its flat, horizontal portion attached to the vehicle seat.

* * * * *